Aug. 26, 1969 K. R. ARMSTRONG ET AL 3,463,408

RECORDING TAPE CARTRIDGE RUN-IN APPARATUS

Filed June 28, 1967 3 Sheets-Sheet 1

INVENTORS.
KIRK R. ARMSTRONG,
EDWARD C. MIKOLYCZYK,
CARL S. NELSON,

BY THEIR ATTORNEYS

Spensley & Horn

RECORDING TAPE CARTRIDGE RUN-IN APPARATUS

Filed June 28, 1967 3 Sheets-Sheet 2

INVENTORS.
KIRK R. ARMSTRONG,
EDWARD C. MIKOLYCZYK,
CARL S. NELSON,

By THEIR ATTORNEYS Spensley & Horn.

RECORDING TAPE CARTRIDGE RUN-IN APPARATUS

Filed June 28, 1967 3 Sheets-Sheet 3

INVENTORS.
KIRK R. ARMSTRONG,
EDWARD C. MIKOLYCZYK,
CARL S. NELSON,
By THEIR ATTORNEYS
Spensley & Horn.

3,463,408
RECORDING TAPE CARTRIDGE RUN-IN APPARATUS

Kirk R. Armstrong, Costa Mesa, Edward C. Mikolyczyk and Carl S. Nelson, Los Angeles, Calif., assignors to Capitol Records, Inc., Hollywood, Calif., a corporation of California Filed June 28, 1967, Ser. No. 649,501
Int. Cl. G11b *15/32;* B65h *25/32, 17/42*
U.S. Cl. 242—55.19 6 Claims

ABSTRACT OF THE DISCLOSURE

Apparatus for receiving a cartridge containing an endless loop of magnetic recording tape incorporating a short strip of sensing tape and automatically rapidly advancing the tape loop through a complete cycle to equalize and adjust tape tension and then ejecting the cartridge upon detection of the sensing tape strip. Electrical control circuitry is provided for acceleration of a capstan drive mechanism at a predetermined slow rate to a steady state high tangential velocity, independent of load variations, and for quickly actuating an ejection mechanism upon detection of the sensing strip.

Background of the invention

Magnetic recording tape cartridges typically comprise an endless loop of recording tape wound on a hub, the tape hub being rotatably mounted in a housing in which the tape loop is routed past an opening positioned so as to be in alignment with the capstan drive of a tape cartridge played. In the loading of such cartridges the tape wound hubs are manually placed into the cartridge housings, and at the time of loading multiple-track tape cartridges, a small piece of metal foil tape is secured to the recording tape at the point where it is desired to actuate track switching circuitry. As a part of the quality control measures employed by commercial manufacturers of such tape cartridges, upon completion of a cartridge the tape is run through a complete cycle to insure that it will run properly in a tape player and that the aluminum foil is firmly secured to the recording tape. The present invention is directed toward high speed, automatic apparatus for running a cartridge tape through a complete cycle and verifying the presence of the aluminum foil sensing tape strip.

Summary of the invention

The present invention provides an automatic apparatus for the receipt of an endless loop magnetic tape cartridge which has been previously loaded with a tape (typically although not necessarily manually). The present invention apparatus, upon insertion of the loaded cartridge therein, automatically will drive the endless loop tape through one complete revolution and then automatically eject the same. During the drive cycle the tape is automatically and slowly (at a predetermined acceleration) brought up to its terminal velocity (60 inches per second in the presently preferred embodiment) in order to cause the tape to be insured of being at the correct and uniform wind tension within the cartridge.

The sensing means for determining ejection of the cartridge is by means of a conducting foil disposed on the oxide side of the tape serving to close a circuit which actuates a solenoid which in turn causes a rod or shaft to strike the cartridge with sufficient force to disengage a retaining spring which otherwise holds the cartridge within the apparatus. At the time of sensing the foil (indicating one complete pass of the tape within the cartridge) the capstan drive motor is not braked so that ejection occurs when the tape is still moving.

The slow start feature of the present invention run-in apparatus prevents the throwing of a loop of tape out of the cartridge and also prevents possible crimping of the tape within the cartridge.

Description of the preferred embodiment

Figure 1:
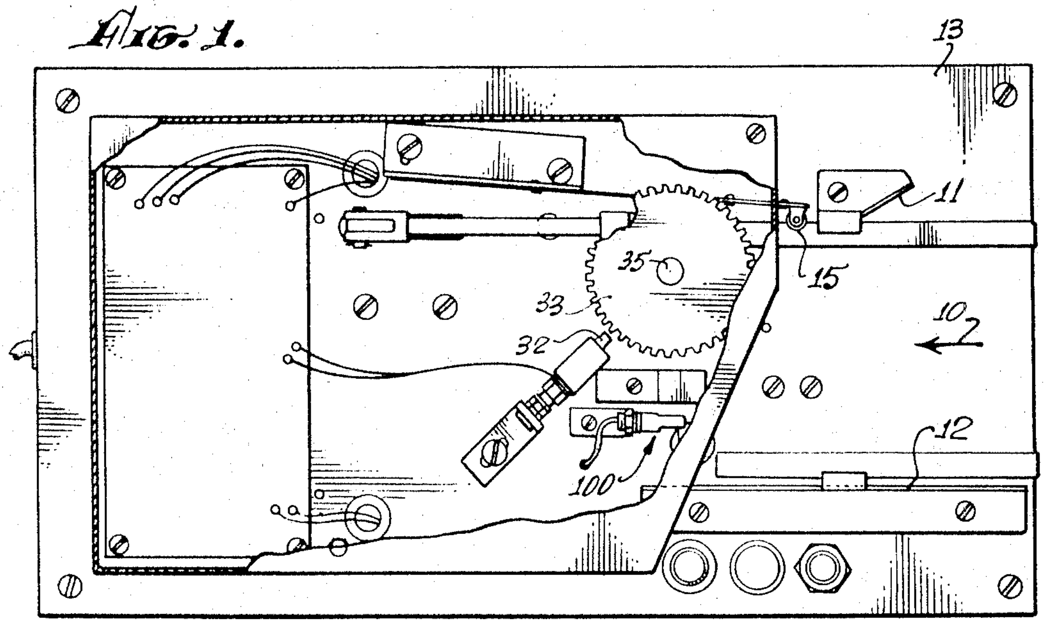
FIGURE 1 is a plan view, partly in section, of the presently preferred embodiment of the invention.
Figure 3:
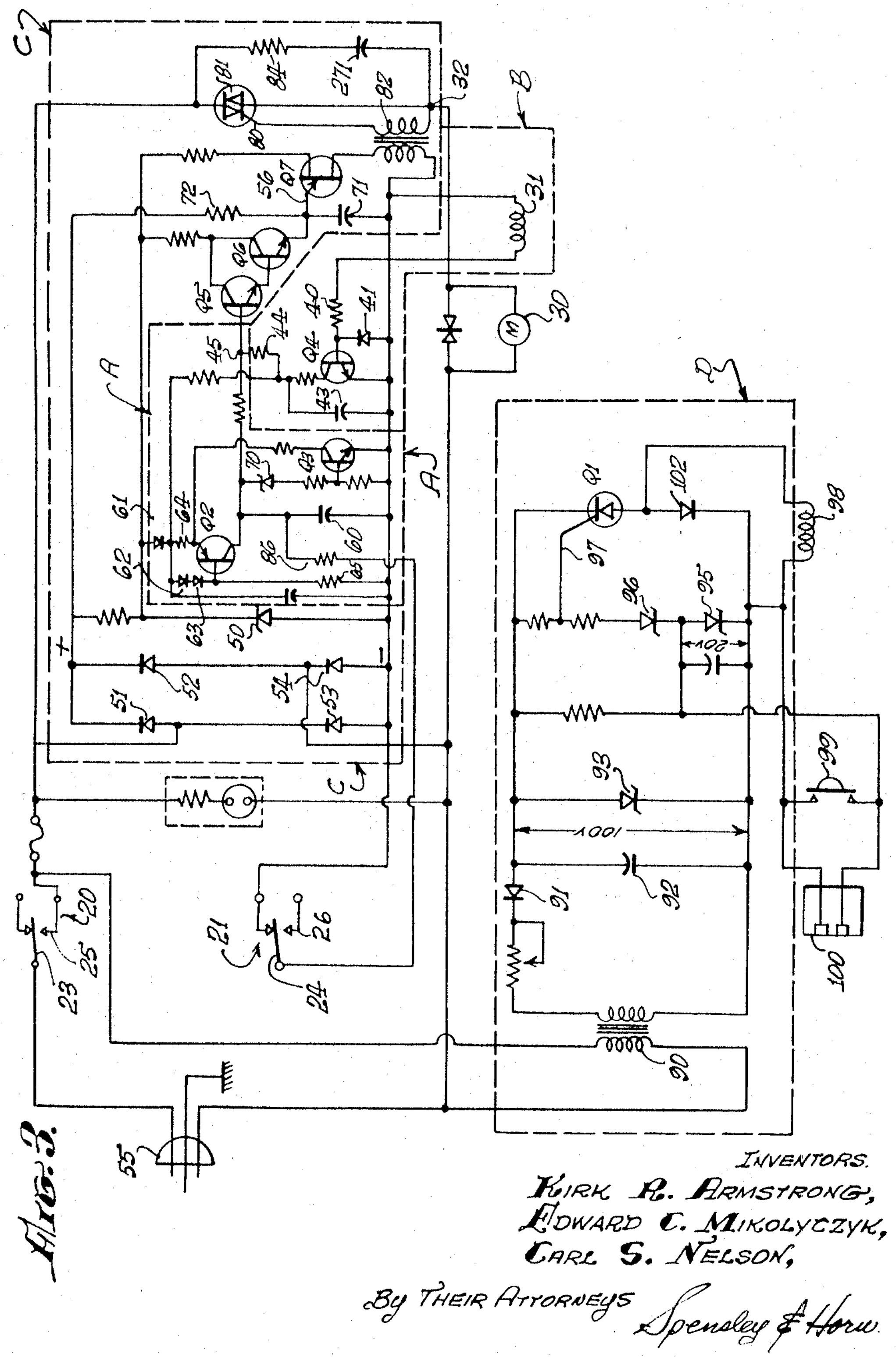
FIGURE 3 is a circuit diagram of the contact circuit for the present invention apparatus.

Upon loading a magnetic tape into a cartridge the two tape ends are spliced together to create a continuous tape loop. A strip of metal foil, typically aluminum, is secured to the tape at the splice for the purpose of actuating a track changing mechanism in a tape player. Foiled back splicing tape is typically used as a matter of convenience to combine the tape splicing and marking operations. A tape loaded cartridge (of a type well known in the art, not shown) is inserted in the direction of arrow 10 within the apparatus between the guides 11 and 12 affixed to base plate 13. Upon inserting the cartridge between the guides 11 and 12, a spring lever roller 15 is urged into an indentation provided in the wall of the cartridge to retain the cartridge fully within guides 11 and 12 and to assure its retention therein until ejection of the cartridge. Micro switches 20 and 21 are both depressed upon insertion of the cartridge within the present invention apparatus. Closing of switches 20 and 21 causes the movable arms 23 and 24 associated with said switch to move from their normal position as shown in FIGURE 3 to the other fixed contacts associated with said switches. These fixed contacts being respectively indicated by the reference numerals 25 and 26. Prior to loading of the cartridge into the present apparatus run-in machine, the aluminum foil is positioned so that it is in register with an opening in the cartridge provided for tape sensing by a pickup head in a playback machine. A foil contactor head in the run-in machine (hereinafter to be described and shown in FIGURE 1 as item 100) is to be disposed in the machine to sense the foil as it comes into registry with the cartridge opening. This will insure that a complete cycle or revolution of the entire tape loop within the cartridge will be completed before the foil again passes the cartridge opening, the foil contactor head initiating generation of a signal to cause ejection of the cartridge in a manner hereafter to be described. The run-in machine, in accordance with the presently preferred embodiment of this invention, is composed of two circuits, one of them being a motor soft or slow start network to bring the tape up to its terminal velocity at a gradual rate. This network is shown in block form in FIGURE 4. There is also an ejection network to eject the cartridge from the machine upon the completion of the cycle, which circuit may be termed as the ejection circuit.

Figure 4:
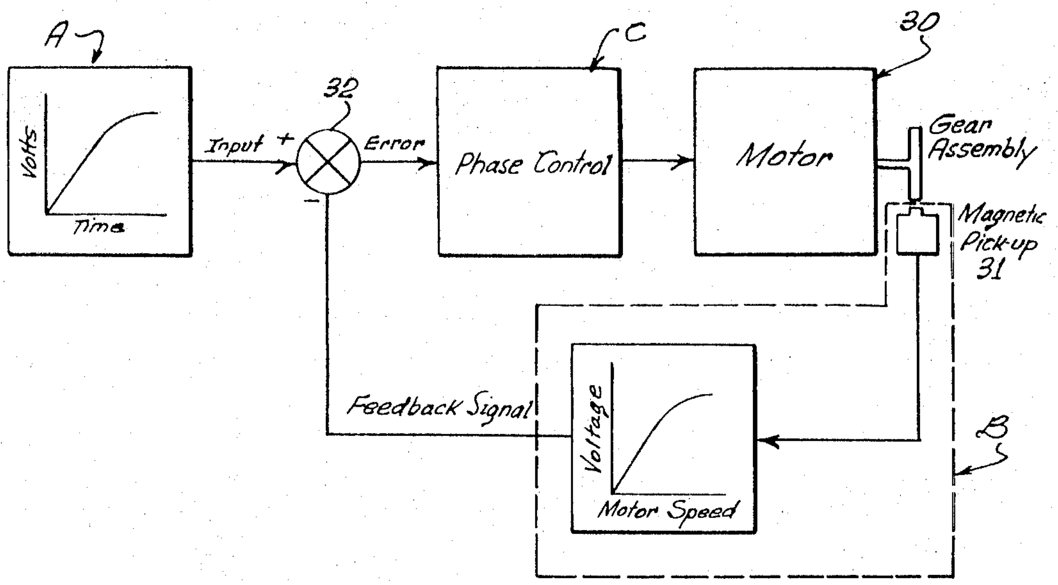
FIGURE 4 is a block diagram of the novel soft start servo motor system.
Figures 5, 6:
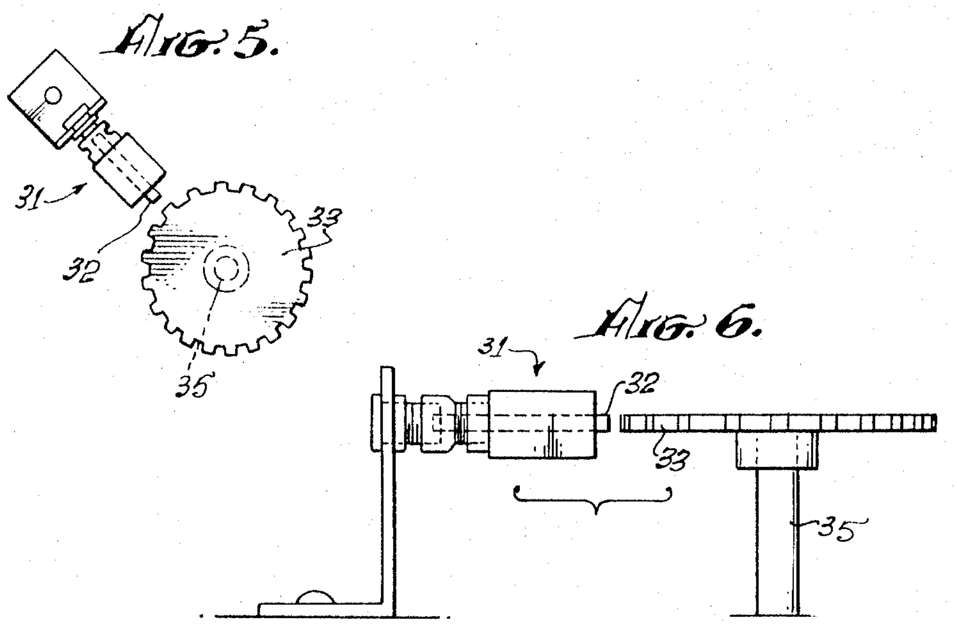
FIGURE 5 is a plan view of the magnetic pick up assembly associated with the feedback loop which controls the soft start motor.
FIGURE 6 is a front elevation of the assembly of FIGURE 5.

With reference to the soft start circuit, attention is to be directed to FIGURE 4. The nature of the load on the drive motor, indicated in FIGURES 3 and 4 by numeral 30, is of such nature that as the motor builds up to rated speed (terminal velocity) after being started, the hub and the tape cartridge will turn quite fast but its flange will not. This implies that the tape will not wind as fast as it is being pulled, hence unless provision is made to prevent this a tape loop will be thrown out of the cartridge possibly causing the tape to wrap around other parts in the machine and resulting in damage to the tape. To avoid this problem, the motor must be brought up to speed gradually, that is, the flange and hub must be brought up to the running speed simultaneously. The soft start circuit shown in FIGURE 4 accomplishes this result. Since the load is variable and since it is desirable to provide the acceleration regardless of the load, the present invention closed loop system is employed. The input signal is generated by the portion of the circuit shown in FIGURE 3 enclosed within the block designated by the letter A. The circuit portion of FIGURE 3 (within that enclosed within block A thereof) may be referred to as a ramp function circuit. It reaches its maximum output voltage after a predetermined time period. A magnetic pick up coil 31 provides the feedback signal which is a voltage proportional to the motor speed. This signal is applied to junction 32 in FIGURE 4. This input signal and the feedback signal generated by that portion of the circuit in FIGURE 3 contained within the block B are summed (note that in FIGURE 4 they are of opposite polarities) and the resultant error signal drives a phase control circuit enclosed within the block designated by the letter C in FIGURES 3 and 4. This drives the motor providing smooth acceleration from zero velocity to the terminal velocity. That portion of the circuit in FIGURE 3 contained within B will now be described. The magnetic pick up 31 (whose mechanical arrangement is shown in FIGURES 5 and 6) includes a pole piece and is arranged with a gear ring 33 mounted on the motor capstan 35. This provides the magnetic pick up coil which will provide a signal which is proportional to the motor speed as the voltage generated within the coil is a result of the EMF generated within coil 31. The rod 32 is a magnetic rod. The magnetic pick up coil 31 is wrapped around the rod 32. The signal generated by this coil 31 is limited by resistor 40, is clipped by diode 41 and amplified by transistor Q4. The output signal from transistor Q4 is integrated by capacitor 43 which goes to the summing junction 45 via resistor 44 which is at the input of transistor Q5. Transistor Q5 which receives the signal at the summing junction 45 forms part of the phase control circuit enclosed within block C in FIGURE 3.

The phase control (block C) operates as follows. A DC driving voltage is derived from Zener diode 50 which clamps the pulsating DC voltage which is the output of the full wave rectifier bridge consisting of diodes 51, 52, 53 and 54, all of which are powered by the 115 volt source 55 upon closing of micro switch 20. Switch 20 is switched as hereinbefore explained upon inserting of the cartridge in the run-in machine. In the presently preferred embodiment the pulsating DC voltage which is clamped by diode 50 is approximately 15 volts. Transistor Q5 drives transistor Q6 which in turn drives transistor Q7 which is connected to the input electrode 56 of unijunction transistor Q7. Transistor Q7 delivers a trigger pulse to the gate phase control circuit which is that part of the circuit within FIGURE 3 enclosed within block C. The trigger circuit is so designed that a time dependent output is obtained after it is initially energized. Initially upon the switching of switches 20 and 21 it causes capactor 60 to be charged by a ramp function generator included within block A. This ramp function generator is followed by a constant current source composed of transistor Q2, diodes 61, 62 and 63 along with resistors 64 and 65. When the voltage across capacitor 60 reaches the breakdown voltage of Zener diode 70, transistor switch Q3 is driven into saturation thus reducing the value of the constant current source from transistor Q2 with its associated circuitry hereinbefore described which is charging capacitor 60. For predetermined periods shortly after switching the voltage across capacitor 60 is a low level thus keeping the base voltage of transistor Q5 to a low level. Thus, the emitter of transistor Q6 is also held at a low voltage. Simultaneously, capacitor 71 is charged every half cycle through resistor 72. The time constant of a combination of resistor 72 and capacitor 71 is long compared to the half cycle of the line voltage and is so selected so that the capacitor voltage at the input of unijunction transistor 56 bearly reaches the peak point voltage at the end of each half cycle where there is zero volts on capacitor 60. As the voltage on capacitor 60 rises, the voltage across capacitor 71 also rises and the combination of resistor 72 and capacitor 71 produces a voltage along a curve which starts from a slightly higher voltage at each cycle. Thus, the voltage across capacitor 71 reaches the peak point of the unijunction transistor slightly early during each half cycle. It will be noted that the combination of transistor Q5 and Q6 are arranged in a Darlington configuration, thus providing a very high impedance so that the charging and discharging currents of capacitor 60 are not shunted away therefrom.

The portion of the circuit of FIGURE 3 enclosed within block C will now be further explained. This is designated as the phase control circuit. The gate electrode 80 of the bi-directional silicon control rectifier 81 is driven from the output of the unijunction transistor Q7 which is coupled to electrode 80 by transformer 82. Depending upon whether the trigger pulse is delivered to the gate electrode 80 early or late in the cycle, the output of the motor load is varied from full-on to full-off (note that the motor 30 is in the circuit with the primary winding of transformer 82). The RC network composed of resistor 84 and capacitor 271 is provided to reduce the commutating voltage change due to the inductive nature of the load on motor 30.

The motor 30 has associated therewith a thyrector (which is in effect two diodes back to back) across its terminal to prevent damages due to any surge voltages. Resistor 86 is connected to the movable contact arm 24 of switch 21 which is normally closed. This resistor 86 is provided to discharge capacitor 60 automatically each time a cartridge is ejected as upon ejection of the cartridge switch 21 returns to its normally closed position as is shown in FIGURE 3 whereby resistor 86 is shunted across capacitor 60.

Figure 2:
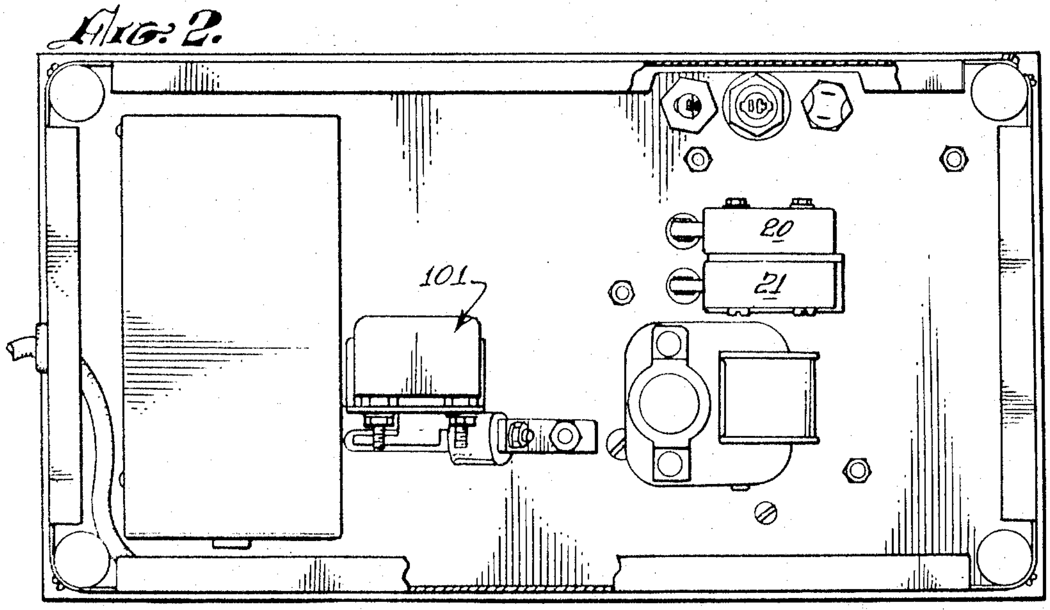
FIGURE 2 is a bottom view of the apparatus of FIGURE 1.

The ejection circuit portion of the present invention is enclosed within block D in FIGURE 4. It operates as follows. When switch 20 has its movable contact 23 switched to fixed contact 25 associated therewith upon insertion of the cartridge, the AC voltage is impressed upon the primary of transformer 90. The voltage across the secondary winding of transformer 90 is half wave rectified by diode 91 and is used to charge capacitor 92 up to the Zener voltage of diode 93 which clamps the voltage across capacitor 92 at 100 volts. In the presently preferred embodiment, it takes about 5 seconds to charge capacitor 92 to this value. In this point Zener diode 95 remains off since the Zener voltages across the combination of diodes 96 and 95 is higher than the Zener voltage across 93. Thus, no current flows through the gate electrode 97 of silicon control rectifier Q1, thus, maintaining the circuit including the ejection solenoid 98 open. The ejection action is initiated by either closing switch 99 (which may be manually closed) or when the aluminum foil is sensed by tape sense head 100. When either of these conditions occur, Zener diode 95 is shorted out and Zener diode 96 is rendered conducting. Current now flows to the gate silicon control rectifier Q1 turning it on and discharging capacitor 92 causing current to flow through coil 98 which drives the plunger associated with solenoid coil 98 hard against the edge of the cartridge thus causing it to be ejected. The entire solenoid assembly 101 is shown in FIGURE 2. Zener diode 95 clamps the voltage across the tape sense head 100 at 20 volts and diode 102 limits the voltage generated in the solenoid when its circuit is opened after it has been energized as previously described. Upon ejection of the tape cartridge from the machine, the microswitches 20 and 21 will return to their normally open positions, thereby de-energizing the apparatus and shutting off the drive motor.

There has thus been described a new and improved apparatus for equalizing and adjusting the tape tension of a magnetic tape housed within a cartridge and a novel soft start motor control circuit including a feedback loop which includes a novel means for generating a back EMF as a portion of the soft start motor control circuit.

What is claimed is:

1. In an apparatus for advancing a continuous loop magnetic tape housed within a cartridge through at least one complete revolution of said loop in order to stabilize the tension of said tape within said cartridge:

(a) means for receiving said cartridge in a predetermined position and for retaining said cartridge;

(b) drive means for accelerating said tape within said cartridge at a predetermined rate to a predetermined high velocity and then maintaining said high velocity; and (c) means for automatically ejecting said cartridge from said apparatus upon completion of said revolution, and upon ejection to de-energize said drive means.

2. In the apparatus defined in claim 1 further including a closed loop servo system for controlling said drive means.

3. In an apparatus for advancing a continuous loop magnetic tape housed with a cartridge through at least one complete revolution of said loop in order to stabilize the tension of said tape within said cartridge:

(a) means for receiving said cartridge in a predetermined position and for retaining said cartridge;

(b) drive means energized by insertion of said cartridge into said means for receiving for accelerating said tape within said cartridge at a predetermined rate to a predetermined high velocity and then maintaining said high velocity;

(c) means for sensing when said loop has completed at least one revolution and for generating an electrical signal in response thereto; and (d) means for effecting rapid ejection of said cartridge upon receipt of said electrical signal and for de-energizing said drive means upon cartridge ejection.

4. In the apparatus defined in claim 3, wherein said drive means includes a circuit means whose terminals are connected to a source of power and an electrical control circuit respectively, but which means is in the normally open position; said means being adapted to close the circuit between said source of power and said electrical control circuit upon placing said cartridge in said predetermined position.

5. In the apparatus defined in claim 3, wherein said last named means includes a solenoid actuated plunger rod and electrical capacitor means which is adapted to discharge and to energize said solenoid upon receipt of said electrical signal.

6. In an apparatus as defined in claim 1, wherein said drive means includes in the circuit controlling it a magnetic pickup coil which provides a signal proportional to the speed of the drive means to produce an EMF which determines the velocity of said drive means.

References Cited

UNITED STATES PATENTS

| | | | |
|---|---|---|---|
| 2,778,637 | 1/1957 | Eash | 242—55.19 |
| 2,999,295 | 9/1961 | Manning | 226—42 X |
| 3,126,162 | 3/1964 | MacKenzie | 226—118 X |

M. HENSON WOOD, Jr., Primary Examiner

R. A. SCHACHER, Assistant Examiner

U.S. Cl. X.R.

226—43, 118, 195